Sept. 2, 1941.    J. B. P. H. GALLE    2,254,943
RADIO DIRECTION FINDING
Filed July 23, 1937    2 Sheets-Sheet 1

Inventor:
JEAN BAPTISTE PAUL HENRI GALLE
By Haseltine, Lake & Co.
Attorneys.

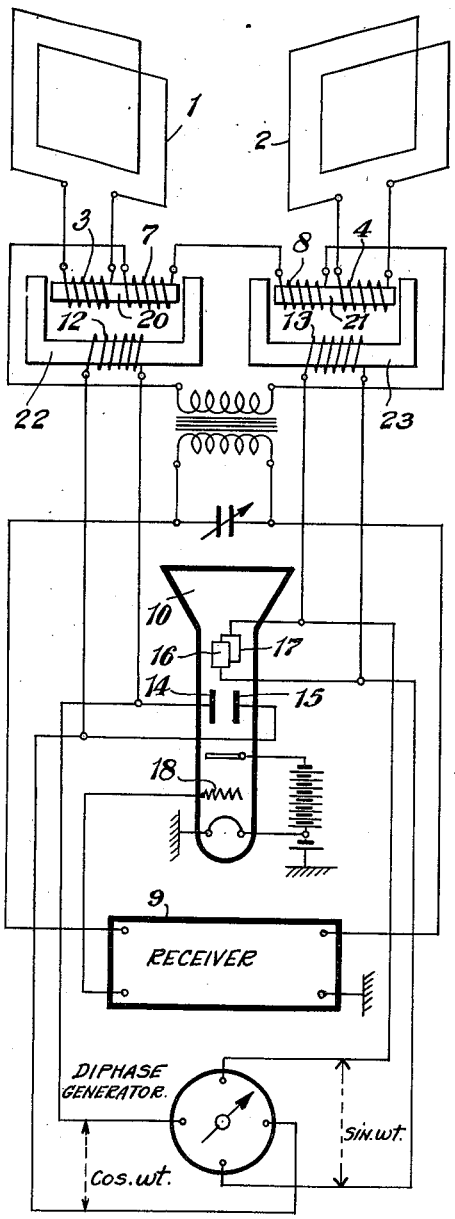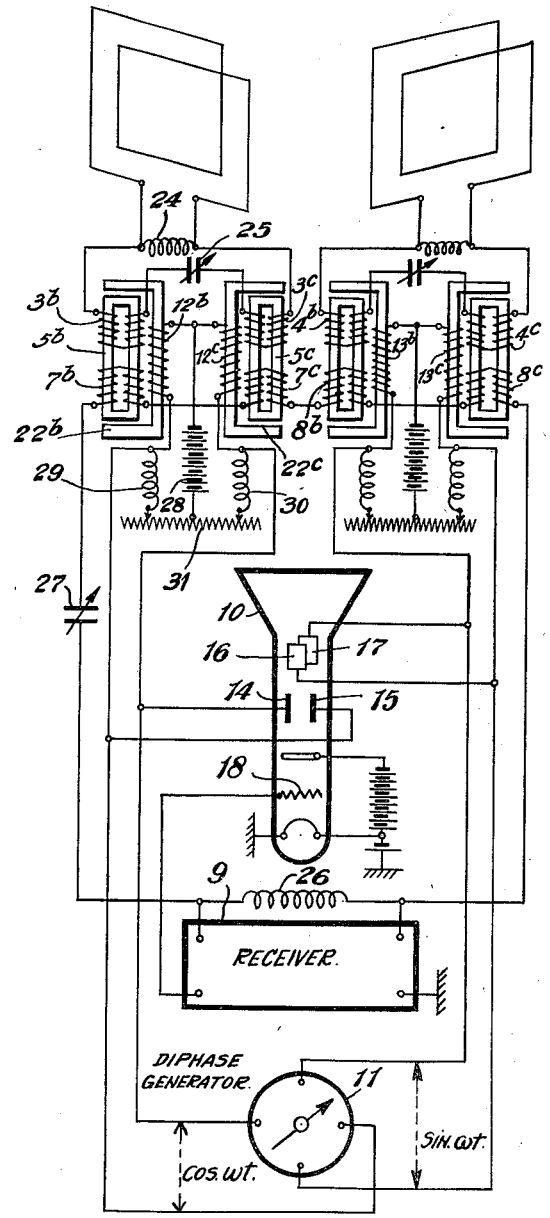

Patented Sept. 2, 1941

2,254,943

UNITED STATES PATENT OFFICE 2,254,943

RADIO DIRECTION FINDING

Jean Baptiste Paul Henri Galle, Sceaux, France, assignor to Société Anonyme: Jaeger-Aviation, Levallois-Perret, Seine, France Application July 23, 1937, Serial No. 155,176
In Belgium July 29, 1936

2 Claims. (Cl. 250—11)

This invention relates to improvements in radio direction finding.

It more especially refers to the process in which use is made of fixed directional aerials, such as loops, angularly displaced relatively to each other in which the wave received induces currents the amplitude of which depends on the angle of incidence of the wave relatively to said aerials, said currents being separately modulated at the same frequency, but with phase displacements respectively corresponding to the angular displacements of the loops. The currents thus modulated act on each other for giving a resulting current out of phase, relatively to one of the modulations and giving, by means of a phasemeter, the indication of the angular displacement of the incident wave relatively to the position of the directional aerial or loop taken as origin of the bearings.

The present invention is characterised by the fact that modulating of the currents induced in the aerials by the incident wave, is obtained by producing a coupling of the circuits of the aerials and of the input circuit of a receiver by means of magnetic or electrostatic fields of force, the receiver supplying a phasemeter of known type and not claimed herein, and also by causing, according to a continuous law, the said coupling to vary between the circuits of said induced current and the receiving circuit.

In other words, the phasemeter as disclosed herein is of the prior art with respect to this application, while the novel features will be set forth in detail hereinafter.

The present invention also relates to a number of particular features which will appear from the following description with reference to the accompanynig drawings, given by way of example only, in which:

Fig. 3 is a diagrammatic view of a third form of construction.

Fig. 4 is a diagrammatic view of a constructional modification of Fig. 3.

In the various diagrammatic views of the drawings, it has been assumed, for facilitating the description, that use was made of two loops at right angles to each other, but it is obvious that use might be made of any number of loops angularly displaced, either regularly, or in any manner whatever, the only condition to be observed being that the modulating currents or modulating electromotive forces should be in corresponding number and out of phase relatively to each other identically to the angular displacement of said loops.

Likewise, instead of utilising loops for receiving the incident wave, use might be made of any other well known directional aerials, such as the aerials known under the name of Adcock aerials employed in particular for overcoming night effect.

Figure 1:
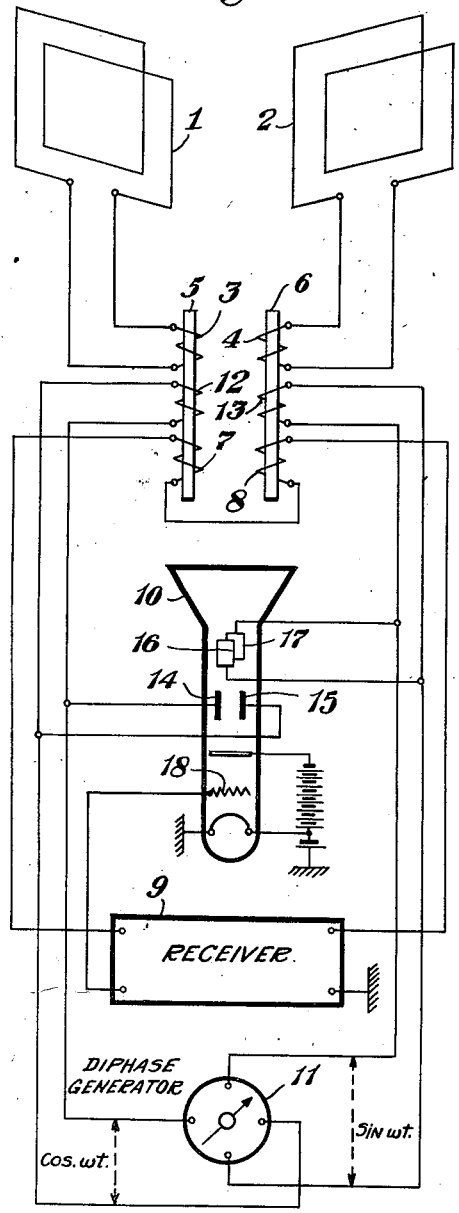
Fig. 1 is a diagrammatic view of a first form of construction of the invention.

In the diagrammatic view of Fig. 1, two loops 1 and 2 are arranged so as to be at right angles to each other, in order to receive two perpendicular components of the incident wave emitted by the station and the direction of propagation of which is to be determined. These components generate, in the coils 3 and 4, respectively connected to the terminals of loops 1 and 2, high frequency currents the amplitudes of which are a function of the direction of the incident wave relatively to said loops 1 and 2, that is to say, are functions of the components received by said loops. These induced currents are obviously in phase and have a common frequency equal to that of the incident wave received by loops 1 and 2.

The self-induction coils 3 and 4 are identical or are rendered identical in their action and constitute the primary windings of a transformer having two high frequency iron cores 5 and 6. The corresponding secondary windings 7 and 8 of this transformer are connected in series in the circuit of a tuned receiver 9 feeding a phasemeter of any suitable and known construction, such for instance as a cathode ray oscillograph 10. The self-induction coils 7 and 8 are identical or rendered identical in their coupling function.

For determining the direction of propagation of the incident wave relatively to the loops 1 and 2, the currents, generated in the self-induction coils 7 and 8 by the self-induction coils 3 and 4, respectively, are modulated according to any desired continuous law and, for instance, in the present case, according to a diphase law owing to the fact that both loops 1 and 2 are angularly displaced by 90 degrees.

For that purpose, use is made of a diphase low frequency current produced by a suitable generator 11 one of the phases of which feeds a winding 12 cooperating with the self-induction coils 3 and 7 coupled together, whilst the other phase, displaced by 90° relatively to the first one, feeds a winding 13 cooperating with the windings or self-induction coils 4 and 8 coupled together.

In the same way as for self-induction coils 3 and 4, on the one hand, and 7 and 8, on the other hand, the self-induction coils 12 and 13 are identical or rendered identical in their modulating effects.

In the form of construction of Fig. 1, the self-induction coils 3, 7 and 12 are mounted on a high frequency iron core 5 preferably constituted, in the known manner, by an agglomerated core made of magnetic powder. The self-induction coils 4, 8 and 13 are similarly mounted on a magnetic core 6 identical to 5 and without mutual induction existing between these cores.

From the foregoing, it will be easily understood that the currents respectively induced in the loops 1 and 2 give rise, in coils 7 and 8, to currents modulated according to the frequency of the diphase modulating current feeding the self-induction coils 12 and 13. In fact, the coupling between the self induction-coils 3 and 7 on the one hand, and between the self-induction coils 4 and 8 on the other hand, is rendered variable and modulated at a frequency $f$ (which is the frequency of the diphase current generated by the generator 11) by means of the self-induction coils 12 and 13, respectively. The currents generated in 7 and 8 have their modulations out of phase to the extent of 90 degrees and their maximum amplitudes are function of the electromotive forces respectively induced in loops 1 and 2, that is to say a function of the inclination of these loops on the direction of propagation of the incident wave. From this fact, the superposition, in known manner, of these currents of frequency F modulated to frequency $f$ will create, after amplification, a resulting current of frequency F modulated to frequency $f$, the maximum of which will be determined in amplitude and in phase by the relative values of the currents induced in the aerials 1 and 2; the phase of this final current is therefore determined by the azimuth of the incident wave. Consequently, if this current is amplified, then detected in order to maintain only the modulation of frequency $f$, the phase difference between this modulation and any one of the modulating currents passing through 7 or 8 gives an angular value of the incidence of the radioelectric wave.

In the cathode ray tube 10, two pairs of plates 14—15 and 16—17 are subjected to two-phase voltages of same frequency $f$ feeding the self-induction coils 7 and 8. The spot of the cathode ray tube therefore traces a Lissajou circle. But, the grid 18 receives the sinusoidal voltage of frequency $f$ issuing from the receiver 9, which voltage is superposed on a negative voltage polarizing the grid 18. If this negative voltage has been adjusted to a value such that the grid 18 is positive for the maximum currents of frequency $f$ issuing from the receiver R, and if it is remembered that the voltages of the deflecting plates 14—15 and 16—17 are two-phase voltages and of frequency $f$, a luminous spot will appear on the screen which translates the angular displacement of the direction of propagation of the incident wave relatively to the aerial or loop taken for origin and the induced current of which is modulated according to the modulation taken for origin.

It is obvious that such an arrangement does not eliminate the directional indetermination of 180 degrees, but the latter will be easily eliminated by any of the known processes, and, for instance, by coupling to the system 7, 8, 9, the current induced in a nondirectional aerial, such as an antenna.

Figure 2:
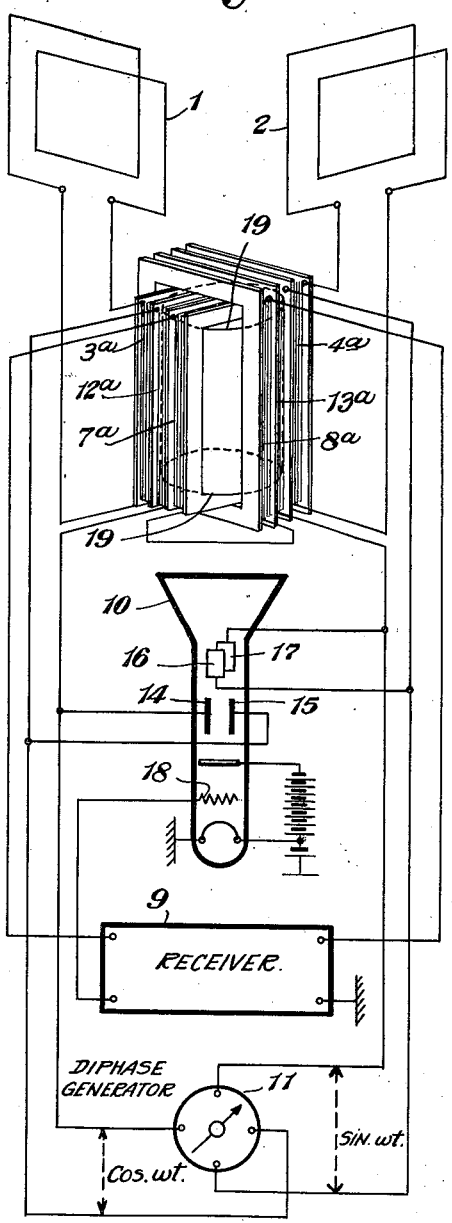
Fig. 2 is a modification of Fig. 1.

In the form of construction of Fig. 2, the loop 1 is connected to a self-induction coil 3ª, and the loop 2 is connected to a self-induction coil 4ª; the self-induction coils 3ª and 7ª are coupled together by a magnetic core 19 which also serves for coupling the self-induction coils 4ª and 8ª together, the groups of self-induction coils 3ª, 7ª and 4ª—8ª being at right angles to each other and, consequently, without mutual induction of 3ª—7ª on 4ª—8ª. The self-induction coils of each group are arranged, relatively to the core 19, in order that the coupling, between the self-induction coils 3ª and 7ª, on the one hand, and 4ª and 8ª, on the other hand, should take place in totality or at least for the greater part through the core 19 itself constituted by high frequency agglomerated iron.

In this form of construction, the variation of permeability of iron, creating the modulating of the currents generated in 7ª and 8ª from currents induced in 3ª and 4ª, by the incident wave received in the loops 1 and 2, is effected by a rotating field produced in the core 19 by any suitable means. Thus, as shown in the form of construction of Fig. 2, this rotating field is obtained from two windings 12ª and 13ª surrounding the core 19, displaced by 90° and through which respectively pass the phases of a diphase low frequency current, so-called "modulating current." For that purpose, the coils 12ª and 13ª are supplied with current, as the coils 12 and 13 of Fig. 1, by a diphase generator 11, so that the magnetic fields produced by the coils 12ª and 13ª are in quadrature. The composition of these two fields creates in the core 19 the desired rotating field which causes the permeability of this core to vary in a sinusoidal manner in any fixed direction in space, and which, consequently, also causes the coupling between the coils 3ª—7ª on the one hand, and 4ª—8ª on the other hand to sinusoidally vary. The windings 12ª and 13ª are suitably arranged so as not to produce any prejudicious effect on the self-induction coils 3ª—7ª and 4ª—8ª. The operation of this modification is identical with that of the form of construction of Fig. 1. In fact the only difference is that the coils 3ª—7ª—12ª, on the one hand, and 4ª—8ª—13ª, on the other hand, are arranged at right angles on the same core 19, whereas in Fig. 1, the corresponding coils 3—7—12 on the one hand, 4—8—12 on the other hand, are arranged on cores 5 and 6 which are completely separated.

In the form of construction of Fig. 3, the self-induction coils 3 and 7, on the one hand, and the self-induction coils 4 and 8, on the other hand, are respectively arranged on cores 20 and 21 made of high frequency magnetic material. These magnetic cores N and N' are respectively arranged in the air-gap of two identical electromagnets 22 and 23, the windings 12 and 13 of which are respectively fed by the phases of a diphase modulating current generated by the diphase generator 11, similarly to Fig. 1, so that the permeability of cores 22 and 23 varies according to an out of phase relation of the currents operating the circuits of the windings.

The modulating of currents generated in the self-induction coils 3, 4 by the currents induced in the loops 1 and 2, takes place in a manner identical to that of the form of construction of Fig. 1, and for this reason it will not be described again.

It may be advisable, for reasons of responsiveness and selectivity, to tune, together or separately, on the frequency of the high frequency incident wave received on the aerials 1 and 2, the following circuits:

(a) Loop 1, self-induction coil 3 and loop 2, self-induction coil 4.

(b) Self-induction coils 12, 13 and receiver R.

In this case, it will be understood that the variations of permeability of cores 5 and 6 (Figure 1), 19 (Figure 2) or 20 and 21 (Figure 3) due to the modulating currents would produce, in the arrangements described with reference to Figs. 1, 2 and 3, variations of the values of the self-inductances of the various circuits indicated at (a) and (b) which, from this fact, would no longer be permanently tuned on the incident wave the direction of propagation of which is to be determined. Moreover, these variations of permeability of said cores would produce distortions prejudicial to satisfactory operation of the device. For that purpose, it is convenient, for eliminating these distortions, to cause the magnetic circuits to operate on a rectilinear portion of their curve of magnetic permeability.

Moreover, for simultaneously remedying detunings of the circuits due to low frequency modulating and to the distortions still possible, the coupling circuits may be so designed that their various tuned elements preserve constant self-inductances during modulating.

For that purpose, and as shown in Fig. 4, the transformers are so arranged that, by a suitable differential action, the self-induction remains constant in each of the circuits above mentioned at (a) and (b). To that effect, provisions are made to insure that each variation of self-inductance in a portion of each of the circuits should be compensated by a variation which is equal but of opposed direction of the self-inductance in another portion of the same circuit.

As shown in Fig. 4, for coupling the two self-induction coils 3 and 7 of Figure 3, each of the latter is divided into two windings $3^b$ and $3^c$ for the first, and $7^b$ and $7^c$ for the second one, the windings $3^b$ and $3^c$, on the one hand, and $7^b$ and $7^c$, on the other hand, being identical.

The self-induction coils $3^b$ and $3^c$ are in series with a self-inductance 24 and a condenser 25, the self-inductance 24 being coupled to the aerial by forming a part of the latter, and one at least of these elements 24 and 25 being adjustable so as to allow of tuning the circuit, thus constituted, to the frequency of the incident wave. Similarly the self-induction coils $7^b$ and $7^c$ are in series with a self-inductance 26 and a condenser 27, the self-inductance 26 being coupled to the receiver R, or forming a part of the latter, and one at least of these elements 26 and 27 being adjustable so as to allow of tuning the circuit thus constituted on the frequency of the incident wave.

The self-induction coils $3^b$ and $7^b$, on the one hand, and the self-induction coils $3^c$ and $7^c$, on the other hand, respectively constitute the primary and the secondary of transformers the cores $5^b$ and $5^c$ of which, made of agglomerated high frequency magnetic material, are respectively arranged in the air-gap of modulating electromagnets $22^b$ and $22^c$. As illustrated, the cores $5^b$ and $5^c$ are preferably of the closed magnetic circuit type for avoiding losses in high frequency.

The modulating electromagnets $22^b$ and $22^c$ are provided with windings $12^b$ and $12^c$ connected in series, identical and fed by the low frequency modulating current. The directions of these modulating windings $12^b$ and $12^c$ are such that they give rise, in electromagnets $22^b$ and $22^c$, to fluxes in opposition.

In order to allow of obtaining the constancy of the self-inductances in the circuits of the loop I and of the receiver, the electromagents $22^b$ and $22^c$ are moreover subjected to a permanent and constant magnetization by any suitable means. Thus, in the example illustrated, this magnetization is obtained by means of the self-induction coils $12^b$ and $12^c$ themselves. For that purpose, these latter, connected in series to the source 11 of low frequency modulating current supply, are also connected to the terminals of a source 28 of direct current supply through the medium of choke coils or the like 29 and 30 preventing the passage of low frequency modulating current. In the example illustrated, the ends connected together of the self-induction coils $12^b$ and $12^c$ are connected to one of the terminals of the source 28 of direct current supply, whilst the other ends of these self-induction coils $12^b$ and $12^c$ are respectively connected to the contacts of a potentiometer 31 through the medium of choke coils 29 and 30.

The directions of the windings of $3^b$ and $7^b$, on the one hand, and of $3^c$ and $7^c$, on the other hand, are such that the modulating effects of the coupling between $3^b$ and $7^b$ are added to those of the coupling between $3^c$ and $7^c$.

Similarly, the loop 2 is connected in series with the self-induction coils $4^b$ and $4^c$ the sum of the self-inductances of which is maintained constant by the same means as previously and which serves to ensure the coupling with the self-induction coils $8^b$ and $8^c$ of the receiver 9. It will be understood from what has been stated with reference to the preceding figures, that the modulating fluxes of the coupling between the respective groups of self-induction coils will be out of phase to the extent of 180° for the groups $3^b$—$7^b$ and $4^b$—$8^b$ on the one hand, and $4^b$—$8^b$ and $4^c$—$8^c$ on the other hand, and of 90° for groups $3^b$—$7^b$ and $4^b$—$8^b$ on the one hand, and $3^c$—$7^c$ and $4^c$—$8^c$ on the other hand. This will be obtained by means of modulating fluxes suitably out of phase and generated either by the two phases of a diphase current, the modulating windings being then wound in reverse directions two by two, or by the four phases of a tetraphase current, the modulating windings being then all wound in the same direction.

What I claim as my invention and desire to secure by Letters Patent is:

1. In a radio direction finding device, two directional aerials displaced at right angles relatively to each other, a receiving circuit comprising a phasemeter, coupling means between the circuits of the aerials and the receiving circuit comprising a magnetic core, two aerial induction coils respectively connected to each aerial and arranged at right angles on the magnetic core, two receiving induction coils connected in series in the receiving circuit and also arranged at right angles on the magnetic core, means for producing in the magnetic core a modulating rotating field.

2. In a radio direction finding device, two directional aerials displaced at right angles relatively to each other, a receiving circuit comprising a phasemeter, coupling means between the circuits of the aerials and the receiving circuit comprising a magnetic core, two aerial induction coils respectively connected to each aerial and arranged at right angles on the magnetic core, two receiving induction coils connected in series in the receiving circuit and also arranged at right angles on the magnetic core, two modulating induction coils also arranged at right angles on the magnetic core, means for feeding said modulating induction coils with alternating currents having the same frequency, but the phases of which are diplaced at right angles.

JEAN BAPTISTE PAUL HENRI GALLE.